Patented Nov. 21, 1950

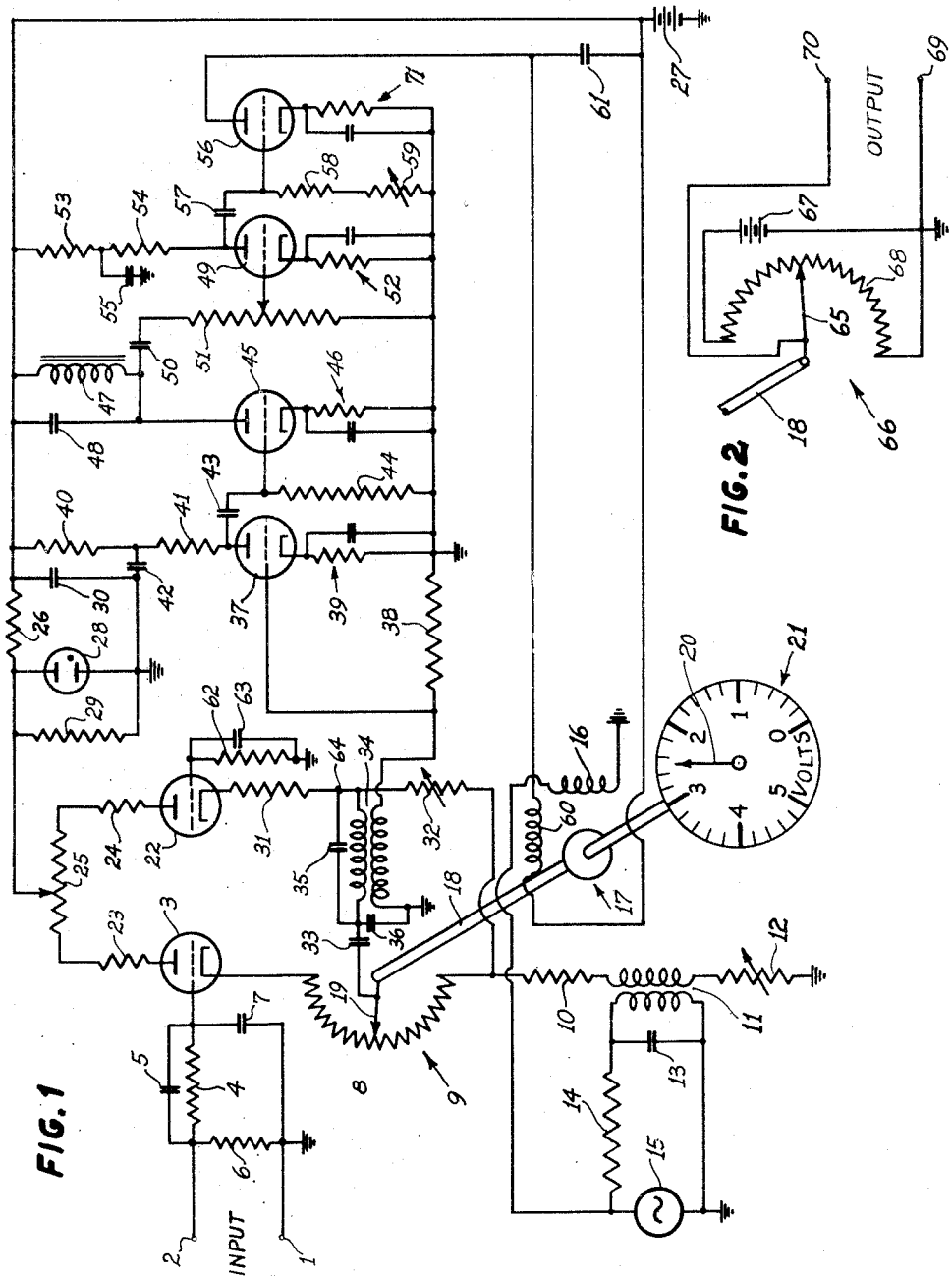
INVENTORS
MICHEL N. YARDENY
BY ADOLPH RAZDOWITZ
Karl F. Ross
AGENT.

2,530,642

UNITED STATES PATENT OFFICE 2,530,642

ELECTRICAL CONTROL DEVICE

Michel N. Yardeny and Adolph Razdowitz, New York, N. Y.; said Razdowitz assignor to said Yardeny Application July 2, 1948, Serial No. 36,768

12 Claims. (Cl. 318—29)

The present invention relates to electrical control devices for displacing a controlled element in accordance with the magnitude of an input electrical variable (e. g. voltage).

An object of the present invention is to provide a device of the character described which may be used as an indicator of great accuracy, as a remote control means and/or as a D.-C. amplifier.

Another object of the invention is to provide an improved device of the character described which will be sensitive to small variations in the input electrical variable.

According to a feature of the present invention, there is provided a controlled element coupled to an A.-C. motor which is energizable from a source of alternating current over a normally balanced circuit adapted to be unbalanced by the input electrical variable, so that current will flow to actuate said motor in one sense or the other, depending on the direction of change of the variable, until a follower member entrained by the motor restores the circuit to balance. The controlled element may be represented, for example, by the pointer of a voltage indicator, by a load-positioning member or by the wiper of a potentiometer, the device in the latter case being adapted to act as a D.-C. amplifier.

The above and other objects and features of the present invention will become apparent from the following description, taken in conjunction with the accompanying drawing in which:

Fig. 1 is a circuit diagram of a device according to the invention, operating as a voltage indicator; and Fig. 2 is a partial modification of the device shown in Fig. 1, adapting the same to operate as a D.-C. amplifier.

Referring to Fig. 1, there are shown at 1, 2 a pair of input terminals to which an unknown voltage, representing the aforesaid variable, may be applied.

Terminal 1 is grounded whereas terminal 2 is connected to the grid of a vacuum tube 3 by way of a resistor 4 which is bridged by a condenser 5.

A resistor 6 and a condenser 7 are connected between ground and respective terminals of the resistor 4.

The cathode of tube 3 is connected to ground by way of the resistance element 8 of a potentiometer 9, a resistor 10, the secondary of an input transformer 11, and a rheostat 12. The primary of transformer 11, shunted by a condenser 13, is connected in series with a resistance 14 across the terminals of an alternating current generator 15. Likewise connected across the generator 15 is one field winding 16 of a servo motor 17 of the two-phase type, this motor having a shaft 18 which on one end carries the wiper 19 of potentiometer 9 and on the other the pointer 20 of a voltage indicator 21.

The plates of tube 3 and of a companion tube 22 are connected, over respective anode resistors 23, 24, a balancing resistor 25 and a decoupling resistance 26, to the positive pole of a grounded battery 27. Resistance 26 forms part of a voltage stabilizing network comprising a glow tube 28 shunted by a resistor 29, and a by-pass condenser 30 bridged across battery 27. The cathode of tube 22 is connected to ground over a circuit which includes a fixed resistance 31 and a variable resistance 32 in series with resistor 10, secondary of transformer 11 and rheostat 12.

The junction of resistances 31, 32 is connected to the wiper 19 by way of a coupling condenser 33 in series with the primary of a transformer 34 which is bridged by a condenser 35, the junction of condensers 33, 35 being grounded by means of a small biasing condenser 36. The right hand terminal of the secondary of transformer 34, whose left-hand terminal is grounded, is connected to the grid of a vacuum tube 37 provided with a grid leak resistor 38. The cathode of tube 37 is biased by a network 39. Series resistors 40, 41 connect the plate of tube 37 to the battery 27, the junction of these resistors being grounded for alternating current by means of a decoupling condenser 42. The tube 37 is coupled by way of condenser 43 and grid leak 44 to another tube 45 provided with biasing network 46, the plate load of this tube comprising a parallel resonant network tuned to the generator frequency which consists of an audio frequency choke 47 and a capacitor 48.

The plate of tube 45 is coupled to the grid of a further tube 49 by way of a coupling condenser 50 and a potentiometer 51, tube 49 being provided with a cathode biasing network 52 and having its plate connected to battery 27 through a pair of series resistors 53, 54 of which the junction point is grounded for high frequencies by a decoupling condenser 55. Tube 49 is coupled to a final amplifier stage 56 over a condenser 57 and a grid leak which consists of a fixed resistance 58 and a variable resistance 59 in series. The plate of tube 56 is connected to battery 27 over the second winding 60 of motor 17 which is tuned to parallel resonance at the generator frequency by a capacitor 61. A biasing network for tube 56 is indicated at 71.

The grid of tube 22 is grounded through a resistor 62 shunted by a condenser 63.

The operation of the arrangement described is as follows:

When the signal applied across input terminals 1, 2 is zero, the grids of both tubes 3, 22 will be at ground potential and the grid-cathode voltage of these tubes will vary in step with the output of source 15, the space current through both of these tubes being modulated by the transformer 11 whose secondary is common to the cathode circuits thereof. As long as the potentiometer 9 is adjusted so that the alternations applied to its wiper 19 are of the same amplitude as the alternating potential existing on point 64 (the junction between resistors 31 and 32), no current will flow though transformer 34 and the winding 60 will remain de-energized, causing the motor 17 to be inactive.

If, however, the tubes are unbalanced by a signal voltage applied across the (preferably very high) resistor 6, then current will flow through the primary of transformer 34, inducing an alternating voltage of the frequency of generator 15 in the secondary of this transformer which voltage, after amplification in the stages 37, 45, 49 and 56, produces a current in the winding 60 of motor 17. Due to the provision of the phase shifting network 13, 14 and suitable selection of the various coupling circuits the current through winding 60 will either lag or lead the current through winding 16 by substantially 90 degrees, thus resulting in a rotation of the motor 17 in one sense or the other. Such a rotation of the motor will also entrain the wiper 19 and the pointer 20, it being of course understood that suitable transmission means may be inserted between the shaft 18 and the members 19, 20 if desired.

Let us assume that the voltage applied to terminals 1, 2 is of positive sign. Condensers 33 and 35 normally apply a biasing potential to wiper 19 and junction point 64 which will serve to maintain the operating point of tube 3, 22 on the curved portion of their characteristics. As the grid of tube 3 is driven positive by the signal, the amplitude of the alternating current passing through this tube increases, so that an unbalance current will flow through transformer 34 which will have such a phase as to cause the motor 17 to rotate counter-clockwise, resulting in a displacement of wiper 19 which in turn will reduce the amplitude of the alternations applied to the left-hand terminal of the transformer primary. The motor 17 will stop as soon as this point is reached, arresting the pointer 20 in a position which will indicate the value of the signal voltage on the scale of the indicator 21.

When the grid of tube 3 is driven negative, the operation of the system will be similar and opposite to the one just described.

The balancing resistor 25 serves to regulate the flow of current through tubes 3, 22 in such manner that the pointer 20 will indicate a predetermined reference value (e. g. 0) when zero signal voltage (or some other reference voltage) is applied to the terminals 1, 2.

The circuit of Fig. 1 may also be viewed as comprising two parallel circuits (the load circuits of tubes 3 and 22, respectively) which are connected across a source 11 of alternating current, each of these circuits consisting of two series arms separated, respectively, by the wiper 19 and the junction point 64, with the tubes 3, 22 connected as non-linear impedances in the respective upper series arms.

The input condenser 5 serves to speed up the response of motor 17 by permitting the leading edge of a pulse representing a positive or negative increment in signal voltage to act directly upon the grid of tube 3, by-passing the resistor 4 which serves as a grid current limiting resistor. At the same time the condenser 7 discriminates against parasitic pulses of short duration.

Selection of the operating range of indicator 21 may be obtained by suitably adjusting the rheostat 12, resulting in a displacement of the operating point of tubes 3 and 22. The resistance 32 has been made adjustable for the purpose of permitting selection of a convenient working point on potentiometer 9.

Sensitivity control is obtained by means of the variable tap of input resistor 51 to which the grid of tube 49 is connected. Variable resistor 59 controls the phase shift of the current applied to the winding 60.

Fig. 2 illustrates how the device of Fig. 1 may be modified to operate as a D.-C. amplifier. As shown in this figure, the shaft 18 is connected to the wiper 65 of a potentiometer 66 which takes the place of indicator 21. A suitable source of power, shown as a battery 67, is connected across the resistance element 68 of potentiometer 66, and output terminals 69, 70 are connected to the grounded end of resistance 68 and to the wiper 65, respectively. The voltage of battery 67 may be a multiple of, or bear any desired relationship to, the maximum signal voltage applied to the terminals 1, 2.

Although the invention has been described with reference to certain now preferred embodiments only, it will be understood that the same may be realized through numerous modifications and adaptations without departing from its spirit or exceeding its scope as defined in the objects and in the appended claims.

What is claimed is:

1. An electrical control device comprising a first and second vacuum tube, a source of space current for both of said tubes, biasing means normally maintaining the operating points of said tubes on a non-linear portion of their characteristics, first and second output circuits for said tubes, respectively, a source of alternating current, circuit means coupling said source to the inputs of said tubes so as to modulate the respective space currents thereof, a controlled element, driving means for displacing said element, energizing means for said driving means connected between correlated points of said output circuits, respectively, said correlated points being normally balanced in such manner that said energizing means will remain inoperative, input means for applying a control voltage to one of said tubes so as to displace the operating point thereof, whereby said correlated points will be unbalanced and said driving means will be energized, and circuit means actuatable by said driving means to restore said correlated points to balance.

2. A control device according to claim 1 wherein said controlled element comprises a pointer of an indicator.

3. A control device according to claim 1 wherein said controlled element comprises a wiper of a potentiometer.

4. An electrical control device comprising a first and second vacuum tube, a source of space current for both of said tubes, biasing means normally maintaining the operating points of said tubes on a non-linear portion of their characteristics, first and second output circuits for said tubes, respectively, said first output circuit including a potentiometer, circuit means coupling said source to the inputs of said tubes so as to modulate the respective space currents thereof, a controlled element, an A.-C. motor for displacing said element, an energizing circuit for said motor connected between the wiper of said potentiometer and a point of said second output circuit selected to be normally balanced with respect to said wiper in such manner that said motor will remain de-energized, and input means for applying a control voltage to said first tube so as to displace the operating point thereof, whereby said selected point will be unbalanced with respect to said wiper, resulting in the energization of said motor, said wiper being entrainable by said motor so as to restore the balance between the selected point and the wiper.

5. An electrical control device comprising a first and second vacuum tube, each of said tubes including a cathode, a grid and a plate, a source of direct current, first and second output circuits connecting said source across the plate and cathode of said first and second tube, respectively, a source of alternating current common to both of said output circuits, said source of alternating current being connected between the two cathodes on the one hand and the negative terminal of said source of direct current on the other, whereby the direct current through said tubes will be modulated in step with said alternating current, first biasing means normally maintaining the grid of said first tube at a fixed potential, second biasing means connected to maintain the grid of said second tube at a fixed potential, said biasing means being arranged to maintain the operating points of said tubes on a non-linear portion of their characteristics, an A.-C. motor, an energizing circuit for said motor connected between correlated points of said output circuits, respectively, said correlated points being normally balanced in such manner that the amplitude of the modulations are equal thereat, whereby no alternating current will flow in said energizing circuit, input means for applying a control voltage to the grid of said first tube whereby the relative amplitudes of said modulations will change, resulting in the energization of said motor, and a variable voltage divider connected in one of said output circuits and actuatable by said motor so as to restore the balance of said correlated points.

6. A control device according to claim 5 wherein said input means comprises a grid resistance and a condenser shunting said resistance, said condenser offering low impedance to the leading edges of increments in said control voltage.

7. A control device according to claim 5, further comprising a high-frequency bypass condenser connected between the grid and the cathode of said first tube.

8. An electrical control device comprising a first and a second vacuum tube, each of said tubes including a cathode, a grid and a plate, a source of direct current, first and second output circuits connecting said source across the plate of said first and second tube, respectively, a potentiometer in said first output circuit, a source of alternating current, an input transformer having its primary connected across the last-mentioned source and having a secondary common to both of said output circuits, said secondary being connected between the two cathodes on the one hand and the negative terminal of said source of direct current on the other, whereby the direct current through said tubes will be modulated in step with said alternating current, first biasing means normally maintaining the grid of said first tube at a fixed potential, second biasing means connected to maintain the grid of said second tube at a fixed potential, said biasing means being arranged to maintain the operating points of said tubes on a non-linear portion of their characteristics, an A.-C. motor having two field windings, circuit means connecting one of said windings across said source of alternating current, energizing means for the other of said windings connected between the wiper of said potentiometer and a point of said second output circuit selected to be normally balanced with respect to said wiper in such manner that the amplitudes of the modulations are equal thereat, amplifier means connecting said energizing means to said other winding so that, upon unbalancing of said wiper relative to said selected point, current will flow through said other winding, phase shifting means arranged to maintain the currents through both windings in quadrature whereby the motor will be actuated when said wiper and said selected point are unbalanced, said wiper being entrainable by said motor so as to counteract any such unbalancing, and input means for applying a control voltage to the grid of said first tube whereby the relative amplitudes of said modulations will change.

9. A control device according to claim 8 wherein said energizing means comprises the primary of an output transformer.

10. A control device according to claim 9 wherein the primary of said output transformer is connected in series with a D.-C. blocking condenser.

11. A control device according to claim 8, further comprising range control means connected in series with the secondary of said input transformer.

12. A control device according to claim 8 wherein said potentiometer is connected between the secondary of said input transformer and the cathode of said first tube.

MICHEL N. YARDENY.
ADOLPH RAZDOWITZ.

REFERENCES CITED

The following references are of record in the file of this patent:

UNITED STATES PATENTS

| Number | Name | Date |
|---|---|---|
| 1,586,233 | Anschutz-Kaempfe | May 25, 1926 |
| 1,664,455 | King | Apr. 3, 1928 |
| 2,175,869 | Bernarde | Oct. 10, 1939 |
| 2,215,805 | Wills | Sept. 24, 1940 |
| 2,346,838 | Haight | Apr. 18, 1944 |
| 2,440,200 | Jofeh | Apr. 20, 1948 |
| 2,447,321 | Ertzmann | Aug. 17, 1948 |